(12) United States Patent
Hanamoto et al.

(10) Patent No.: US 6,301,079 B1
(45) Date of Patent: *Oct. 9, 2001

(54) FLYING HEAD SLIDER HAVING A SPLAY FORMED ON A FLYING SURFACE ENABLING A LOWER FLYING HEIGHT WHILE AVOIDING COLLISION WITH A SURFACE OF A RECORDING DISK

(75) Inventors: Kazuhisa Hanamoto; Masaharu Sugimoto; Masaki Kameyama, all of Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,377

(22) Filed: Jul. 16, 1998

(30) Foreign Application Priority Data

Feb. 23, 1998 (JP) .................................................. 10-039968
May 22, 1998 (JP) .................................................. 10-141052

(51) Int. Cl.[7] ..................................................... G11B 5/60
(52) U.S. Cl. ........................................................ 360/236.5
(58) Field of Search .............................. 360/103, 235.7, 360/235.9, 236.5, 236.7

(56) References Cited

U.S. PATENT DOCUMENTS

| | | | |
|---|---|---|---|
| 4,130,847 | * 12/1978 | Head | 360/103 |
| 5,105,529 | * 4/1992 | Yasar | 360/103 |
| 5,768,055 | * 6/1998 | Tian | 360/103 |
| 5,898,542 | * 4/1999 | Koshikawa | 360/103 |

FOREIGN PATENT DOCUMENTS

| | | |
|---|---|---|
| 627 732 | 12/1994 | (EP) . |
| 63113989 | 5/1988 | (JP) . |
| 254486 | 2/1990 | (JP) . |
| 3105778 | 5/1991 | (JP) . |
| 3232173 | 10/1991 | (JP) . |
| 457260 | 2/1992 | (JP) . |
| 4137286 | 5/1992 | (JP) . |
| 6111508 | 4/1994 | (JP) . |
| 6139540 | 5/1994 | (JP) . |
| 6150600 | 5/1994 | (JP) . |
| 6195917 | 7/1994 | (JP) . |
| 06282954 | 10/1994 | (JP) . |
| 7111053 | 4/1995 | (JP) . |
| 07169222 | 7/1995 | (JP) . |
| 08045220 | 2/1996 | (JP) . |
| 08069674 | 3/1996 | (JP) . |
| 869675 | 3/1996 | (JP) . |
| 08153319 | 6/1996 | (JP) . |
| 09293223 | 11/1997 | (JP) . |

OTHER PUBLICATIONS

Matsumoto et al.; "Design and performance of novel air bearing slider"; *IEEE Transactions on Magnetics*; vol. 30, No. 6; pp. 4158–4160; Nov. 1994.

* cited by examiner

*Primary Examiner*—A. J. Heinz
(74) *Attorney, Agent, or Firm*—Greer, Burns & Crain, Ltd.

(57) ABSTRACT

A flying head slider comprises a flying surface opposed to the surface of the magnetic disk. Inner and outer rails are formed on the flying surface. Air bearing surfaces (ABS) are defined on the inner and outer rails. A magnetic head element is embedded in the outer rail at the protection layer attached to the end surface of the slider body. A splay is formed on the air bearing surface (ABS) of the outer rail. When the head slider takes off from the surface of the magnetic disk, the head slider takes a slant attitude with the protection layer nearest to the surface of the magnetic disk. The splay in the outer rail serves to avoid the protection layer from colliding with the surface of the magnetic disk even when the head slider rolls. The head slider is capable of making the magnetic head element thereon approach the surface of the magnetic disk as much as possible even if the head slider is expected to change its attitude.

25 Claims, 12 Drawing Sheets

FLYING HEAD SLIDER HAVING A SPLAY FORMED ON A FLYING SURFACE ENABLING A LOWER FLYING HEIGHT WHILE AVOIDING COLLISION WITH A SURFACE OF A RECORDING DISK

BACKGROUND OF THE INVENTION

1. Field of the Invention

The present invention relates to a flying head employed in a recording disk apparatus such as a hard disk drive (HDD), in particularly, to a flying head slider comprising a slider body supported with respect to the surface of a recording disk and a head element supported on an end surface of the slider body downstream of the air stream running along the slider body during rotation of the recording disk.

2. Description of the Prior Art

A flying magnetic head is employed in for example an HDD so as to change and detect the direction of magnetic field in the surface of a magnetic disk without contacting the magnetic disk. When the magnetic disk rotates in such HDD, air stream running along the surface of the magnetic disk serves to make a head slider of the magnetic head fly over the surface of the magnetic disk. As the flying height of the head slider gets smaller, the head element on the magnetic head approaches more to the surface of the magnetic disk, so that high density recording can be realized.

The magnetic head element in the flying magnetic head is covered with a protection layer as shown in for example Japanese Patent Application Laid-open No. 9-293223. Accordingly, when the attitude of the head slider changes, the protection layer happens to approach the surface of the recording disk than the magnetic head element. In order to avoid collision of the protection layer against the surface of the disk when the attitude of the head slider changes, an extra margin needs to be incorporated in the flying height of the head slider because excessive approach of the head slider toward the surface of the disk should be taken into account. As a result, the magnetic head element tends to recede from the surface of the disk even when the head slider takes the proper attitude.

SUMMARY OF THE INVENTION

It is accordingly an object of the present invention to provide a flying head slider capable of making a head element thereon approach the surface of a recording disk as much as possible even when the head slider is expected to change its attitude.

According to a first aspect of the present invention, there is provided a flying head slider comprising: a slider body changeable in attitude and supported with respect to a surface of a recording disk; a head element supported on an end surface of the slider body downstream of an air stream running along the slider body during rotation of the recording disk; a protection layer formed on the end surface of the slider body for covering over the head element; and a splay formed on an air bearing surface of the protection layer downstream of a boundary between the slider body and the protection layer.

The flying head slider may further comprise a pair of rails formed on the slider body at a flying surface opposed to the surface of the recording disk. In this case, the splay is formed at one of the rails which supports the head element at an end surface of the rail within the end surface of the slider body.

With either of the flying head sliders, the protection layer can be eliminated by the splay at a portion nearest to the disk so that less protection layer below the head element can approach the surface of the disk even when the slider body changes its attitude. Accordingly, the head element can approach the surface of the disk as much as possible even when the change in attitude of the slider body is taken into account. In addition, since the splay is terminated at the boundary between the slider body and the protection layer, the slider body is not eliminated so that a lift acting on the air bearing surface cannot vary.

The splay preferably increases its depth from an end surface of the protection layer intersecting the air bearing surface as the splay extends to recede from the head element. The space between the protection layer and the surface of the disk is mostly kept constant even when the slider body rolls about an axis along the air stream.

The slider body may comprise a pad formed on the air bearing surface for preventing the slider body from clinging to the surface of the recording disk. The disposition of the pad requires a slant and/or a roll of the head slider in order to avoid the pad from colliding with the surface of the disk. Accordingly, the splay of the invention comes to most effective when the pad is formed on the air bearing surface of the slider body.

According to a second aspect of the present invention, there is provided a flying head slider comprising: a slider body changeable in attitude and supported with respect to a surface of a recording disk; at least a pair of rails arranged on a flying surface opposed to the surface of the recording disk; a head element supported on at least one of end surfaces of the rails downstream of an air stream running along the slider body during rotation of the recording disk; a protection layer formed on an end surface of the slider body for covering over the head element, said end surface including the end surfaces of the rails; and a pair of splays formed on an air bearing surface of the protection layer at the respective rails downstream of a boundary between the slider body and the protection layer.

The head slider of the above arrangement serves to restrain the variation in the flying height due to a factor such as a warp or an inverse warp of the slider body. For example, when the slider body suffers from a warp so that the flying height of the outer edges in the lateral direction of the slider body gets larger, the splays may extend over inner surfaces of the rails which inner surfaces intersects the air bearing surface. The splays serve to eliminate the protection layer nearest to the surface of the disk below the head element under the influence of the warp, so that the head element can approach the surface of the disk as much as possible even when a warp of the slider body is taken into account. Moreover, since the splays are terminated at the boundary between the slider body and the protection layer, the slider body is not eliminated so that a lift acting on the air bearing surface cannot vary. The splays preferably increase their depth from an and surface of the protection layer intersecting the air bearing surface as the splays extend inward of the slider body.

On the other hand, when the slider body suffers from an inverse warp so that the flying height of the outer edges in the lateral direction of the slider body gets smaller, the splays may extend over inner surfaces of the rails which inner surfaces intersects the air bearing surface. The splays serve to eliminate the protection layer nearest to the surface of the disk below the head element under the influence of the inverse warp, so that the head element can approach the surface of the disk as much as possible even when an inverse warp of the slider body is taken into account. Moreover, since the splays are terminated at the boundary between the slider body and the protection layer, the slider body is not eliminated so that a lift acting on the air bearing surface cannot vary. The splays preferably increase their depth from an and surface of the protection layer intersecting the air bearing surface as the splays extend inward of the slider body.

The head element may comprise a flexible coil pattern bent toward a center of a coil at a portion corresponding to the splay. The flexible coil pattern serves to easily avoid the interference between the coil pattern and the splay, so that the splay can be enlarged to the utmost without damage to the coil. Larger splay may contribute to further reduction in the flying height of the flying head slider above the surface of the disk.

Any of the above-described flying head slider may be applied to a recording disk apparatus comprising a rotating disk and a carriage for supporting the head slider changeable in attitude with respect to the surface of the disk. For example, the swinging movement of the carriage enables the slider body t o track on a recording cylinder or track on the surface of the disk. The recording disk apparatus may include a magnetic disk apparatus such as a hard disk drive unit (HDD), and a magneto optical disk apparatus of a contact start stop type.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
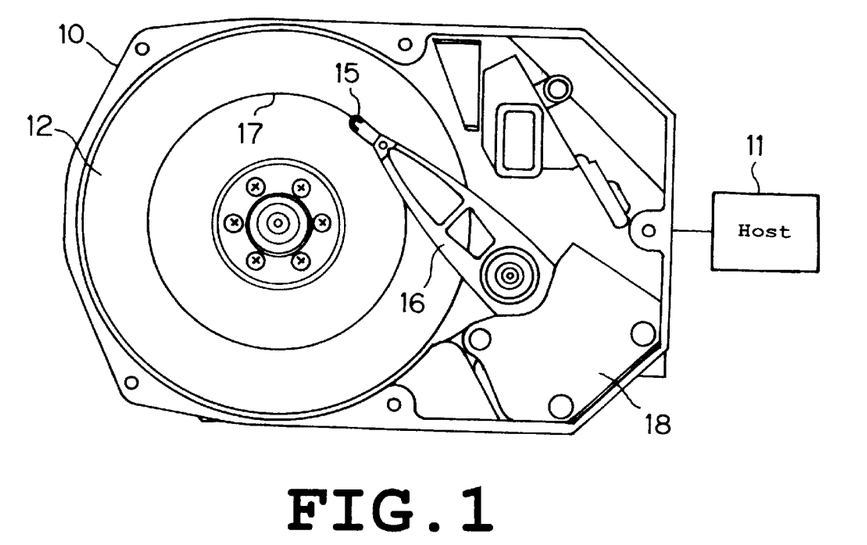
FIG. 1 illustrates the structure of a hard disk drive unit (HDD)

FIG. 1 illustrates a hard disk drive unit (HDD) 10 as a recording disk apparatus. The HDD 10 is adapted to write and read information data to and from a magnetic recording disk 12 based on writing/reading instructions supplied from a host 11 such as a CPU in a computer. The HDD 10 may be assembled in for example a computer, or constructed as a stand-alone exterior file unit attached to a computer.

The HDD 10 comprises a flying head slider 15 with a magnetic head element mounted thereon. The magnetic head element serves to change and detect the direction of magnetic field in the surface of the magnetic disk 12 upon writing and reading operation for information data. The flying head slider 15 can be driven in the radial direction of the magnetic disk 12 through swinging movement of a carriage 16, so that the head slider 15 is allowed to track on a data recording cylinder (circular track) 17 on the surface of the magnetic disk 12. The movement of the carriage 16 is controlled by an actuator 18 constituting a magnetic circuit.

Figure 2:
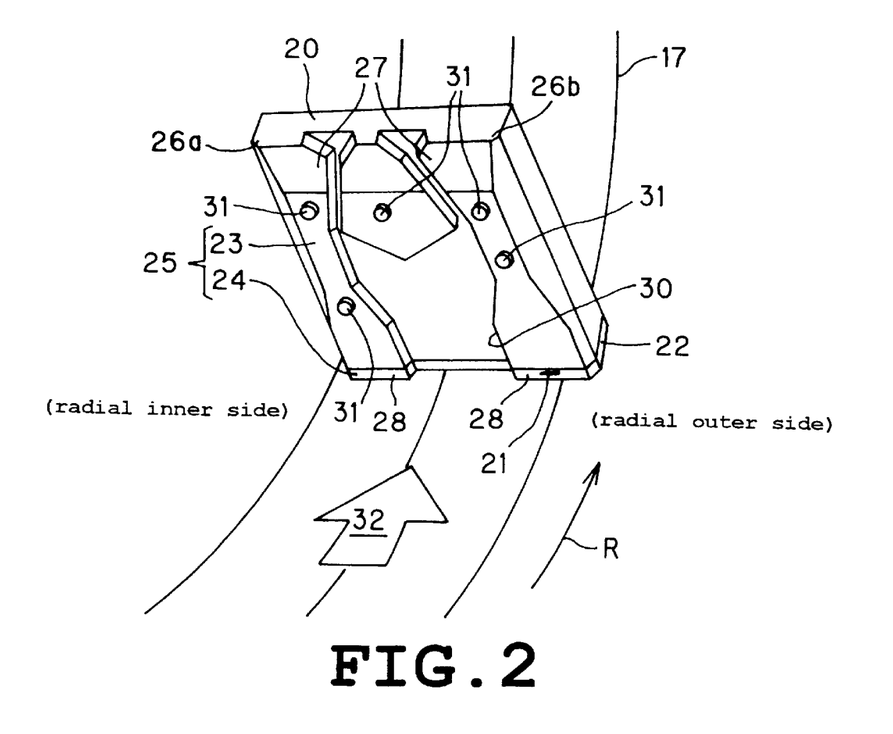
FIG. 2 is a perspective view illustrating the structure of a flying head slider.

The flying head slider 15 comprises, as shown in FIG. 2, a slider body 20 supported with respect to the surface of the magnetic disk 12 and allowed to change its attitude. The slider body 20 is fixed to the tip end of the carriage 16 through an elastic spring plate, not shown. A protection layer 22 is formed on an end surface of the slider body 20 downstream of the rotational direction R of the magnetic disk 12. A magnetic head element 21 is embedded in the protection layer 22. The magnetic head element 21 may include for example a magnetoresistance (MR) element or a giant magnetoresistance (GMR) element. A flying surface 25 of the head slider 15 can be defined by a surface 23 of the slider body 20 opposed to the surface of the magnetic disk 12 and a surface 24 of the protection layer 23 likewise opposed to the surface of the disk 12.

A pair of rails, namely, an inner rail 26a and an outer rail 26b are arranged on the flying surface 25. The inner and outer rails 26a, 26b define air bearing surfaces (ABS) 27 on the slider body 20 and air bearing surfaces (ABS) 28 continuous from the ABS 27 on the protection layer 22. A flow passage 30 is defined between the inner and outer rails 26a, 26b with an enlarged passage downstream of the rotational direction R of the magnetic disk 12. Four pads 31 are formed on the ABS 27 for preventing the slider body 20 from clinging to the surface of the magnetic disk 12.

The head slider 15 is seated on the surface of the magnetic disk 12 when the magnetic disk 12 stays still, and flies over the surface of the disk 12 when the disk 12 rotates. When the magnetic disk 12 starts to rotate, air stream 32 is generated to flow along the surface of the disk 12 in the rotational direction R of the disk 12. The air stream 32 flows along the slider body 20 and acts on the ABS 27, 28 so as to generate a lift for the head slider 15. On the other hand, a negative pressure is generated in the flow passage 30 when the air stream 32 running along the slider body 20 flows through the flow passage 30. The negative pressure in the flow passage 30 is balanced with the lift generated by the ABS 27, 28 so as to determine the flying height of the head slider 15 and the attitude of the slider body 20.

In this embodiment, the slider body 20 is adapted to take a slant attitude with the upstream flying height larger than the downstream flying height along the air stream 32. Such slant attitude serves to avoid the pads 31 on the ABS 27 from colliding with the surface of the magnetic disk 12 even when the magnetic head element 21 on the end surface of the slider body 20 approaches the surface of the magnetic disk 12 downstream of the air stream 32. Accordingly, the magnetic head element 21 can closely approach the surface of the magnetic disk 12 irrespective of the existence of the pads 31. The attitude of the slider body 20 can be controlled by adjusting the shapes of the ABS 27, 28 and flow passage 30.

When the magnetic disk 12 is still, the pads 31 on the ABS 27 contact a lubricating oil layer formed on the surface of the magnetic disk 12. The pads 31 serve to prevent the whole ABS 27, 28 from contacting the lubricating oil layer, so that less adhesive power from the viscosity of the lubricating oil layer acts on the head slider 15. Accordingly, the head slider 15 can immediately take off from the surface of the magnetic disk 12 when the magnetic disk 12 starts to rotate.

Figures 3, 7A, 7B:
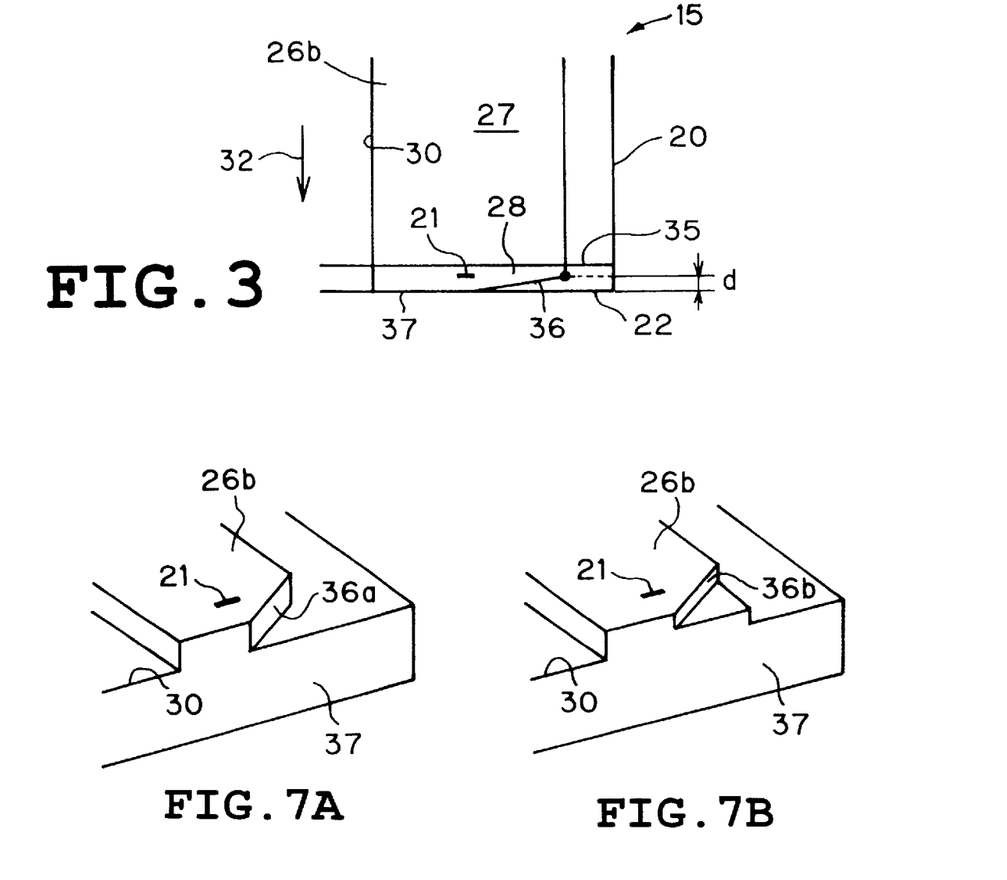
FIG. 3 is a schematic plan view of a flying surface in the flying head slider according to a first embodiment of the present invention.
FIGS. 7A–7D illustrate the variation of the splay according to the first embodiment of the present invention.

FIG. 3 illustrates the detailed structure of the flying head slider 15 according to a first embodiment of the present invention. The head slider 15 comprises a splay 36 formed on the ABS 28 of the protection layer 22 downstream of the boundary 35 between the slider body 20 and the protection layer 22 in the direction of the air stream 32. The splay 36 increases its depth d from the end surface 37, of the protection layer 22, intersecting the ABS 28 as the splay 36 extends to recede from the gap of the magnetic head element 21.

Figure 4:
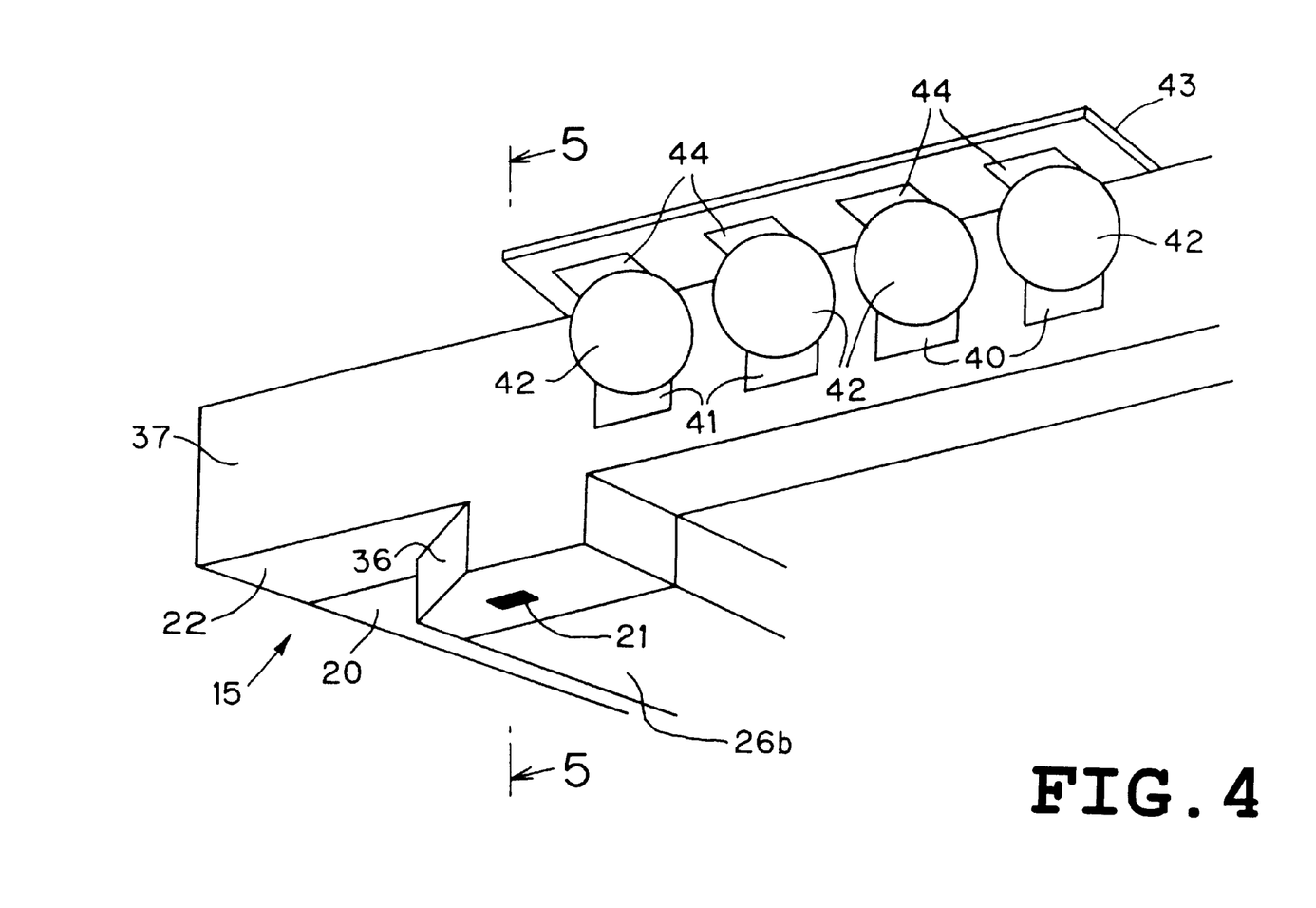
FIG. 4 is an enlarged partial view illustrating an end surface downstream of air stream running along the flying head slider.

As is apparent from FIG. 4, a pair of terminal pads 40 are attached on the end surface 37 of the protection layer 22 for outputting information data signal which the magnetic head element 21 reads out. A pair of terminal pads 41 are likewise attached on the end surface 37 for supplying the magnetic head element 21 with information data signal to be recorded. The terminal pads 40, 41 are electrically connected to an input/output pads 44 formed on a flexible printed circuit board 43 through gold balls 42.

Figure 5:
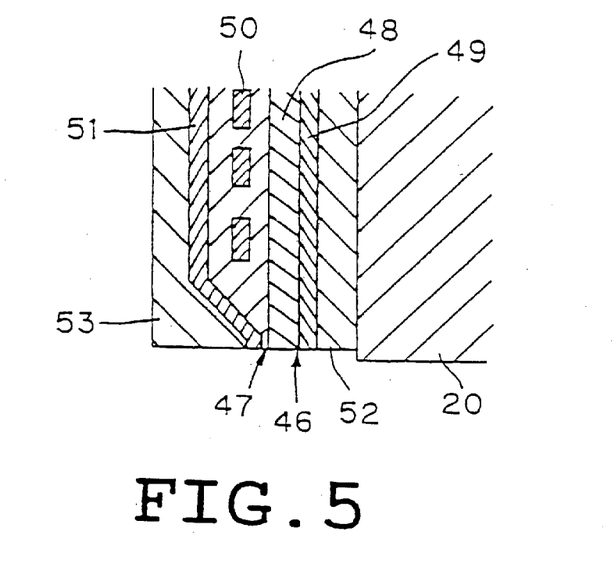
FIG. 5 is an enlarged sectional view taken along the line 5—5 in FIG. 4, illustrating a magnetic head element.

As is apparent from FIG. 5, the magnetic head element 21 comprises a magnetoresistance (MR) layer 46 for detecting magnetic field in the surface of the magnetic disk 12 during the reading operation for information data, and a writing gap 47 for generating magnetic field directed to the surface of the magnetic disk 12 during the writing operation for the information data. The MR layer 46 is disposed between an upper shield layer 48 and a lower shield layer 49. The writing gap 47 serves to effect the magnetic field, generated in an upper magnetic pole layer 51 by the effect of a coil 50, on the surface of the magnetic disk 12. The magnetic head element 21 is inserted between an alumina ($Al_2O_3$) layer 52 formed on the slider body 20 of alumina titanium carbide ($Al_2O_3TiC$) and alumina layer 53 formed on the alumina layer 52. The alumina layers 52, 53 constitute the protection layer 22 in cooperation.

Figure 6:
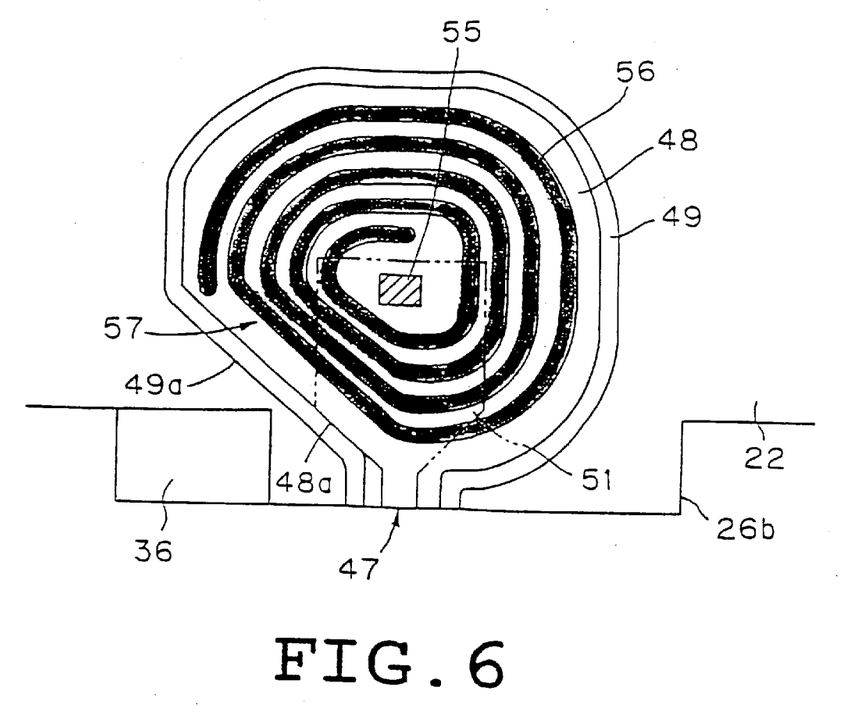
FIG. 6 is an enlarged plan view illustrating a coil.

As shown in FIG. 6, the coil 50 is formed by a spiral printed pattern 56 extending outward from the rear end of a magnetic pole 55 at the center of the coil 50. The printed pattern 56 includes a flexible coil pattern 57 bent toward the center of the coil 50 at a portion corresponding to the splay 36. The extents of the upper and lower shield layers 48, 49 have a depression 48a, 49a bent toward the center of the coil 50 at a portion corresponding to the flexible coil pattern 57. When the protection layer 22 is partly cut off for forming the splay 36, it is possible to avoid the printed pattern 56 from damaging. In addition, it is possible to prevent the upper and lower shield layers 48, 49 from being exposed out of the protection layer 22.

Figure 7C:
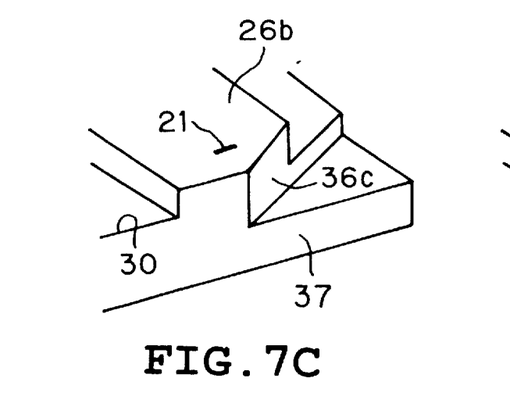
Figure 7D:
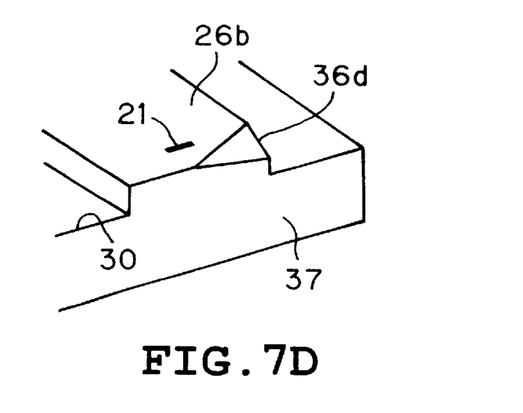

As shown in FIGS. 7A–7D, the above-described splay 36 may take any shape. For example, the splay 36a may be formed by totally cutting off the outer rail 26b by the level of the bottom of the flow passage 30 as shown in FIG. 7A. The splay 36b may be formed by partly cutting off the outer rail 26b by the level above the bottom of the flow passage 30 as shown in FIG. 7B. The splay 36c may be formed by cutting off the outer rail 26b by the level below the bottom of the flow passage 30 as shown in FIG. 7C. The splay 36d may be formed to have a slant as shown in FIG. 7D.

Assume that the flying head slider 15 takes a slant attitude by the roll angle B with respect to the surface of the magnetic disk 12. The term "roll angle" is referred to as an angle by which the slider body 20 rolls about an axis along the direction of the air stream 32. The roll angle B happens to occur, for example, when the head slider 15 moves along the radial direction of the magnetic disk 12 so that the head slider 15 receives air stream 32 from variable directions. Additionally, when the magnetic head element 21 is embedded only in the outer rail 26b, it is preferable to keep the slider body 20 at a slant attitude of roll angle B so that the outer rail 26b approaches the surface of the magnetic disk 12 than the inner rail 26a, because the magnetic head element 21 can approach the surface of the magnetic disk 12 as much as possible while the pads 31 nearest to the end most downstream in the air stream 32 on the inner rail 26a can be prevented from colliding with the surface of the magnetic disk 12. To the contrary, when a magnetic head element is embedded only in the inner rail 26a, it is possible to allow the inner rail 26a to approach the surface of the magnetic disk 12 than the outer rail 26b. The control of the area of the flying surfaces on the inner and outer rails 26a, 26b enables to select any one of the inner and outer rails 26a, 26b for approaching more to the surface of the magnetic disk 12. Any one of the inner and outer rails 26a, 26b with smaller area can approach more to the surface of the magnetic disk 12.

Figure 8:
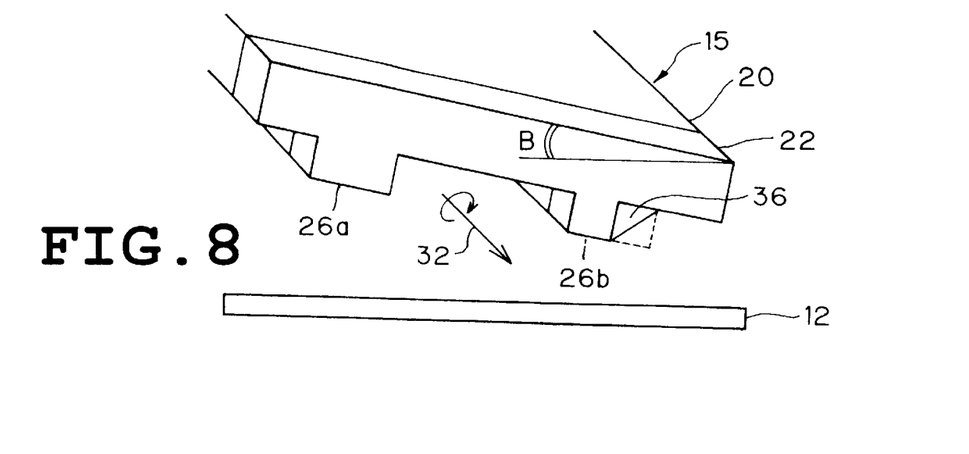
FIG. 8 is a schematic perspective view of the end surface of the flying head slider for explaining a roll angle.

As is apparent from FIG. 8, it is understood that the splay 36 serves to eliminate the protection layer 22 below the level of the magnetic head element 21 as compared with a prior art slider body of the dashed line in FIG. 8. In general, when the flying height of the head slider 15 is determined, the minimum flying height is set for the head slider 15 of the maximum roll angle B at the position achieving the protection layer 22 nearest to the surface of the magnetic disk 12. According to the present embodiment, the magnetic head element 21 can approach more as compared with a prior art slider body by the amount of elimination of the protection layer 22 by the splay 36 at the position of the minimum flying height. As a result, it is possible for the magnetic head element 21 to approach the surface of the magnetic disk 12 irrespective of the magnitude of the roll angle B. The reading sensitivity of the magnetic head element 21 can be enhanced.

Figure 9:
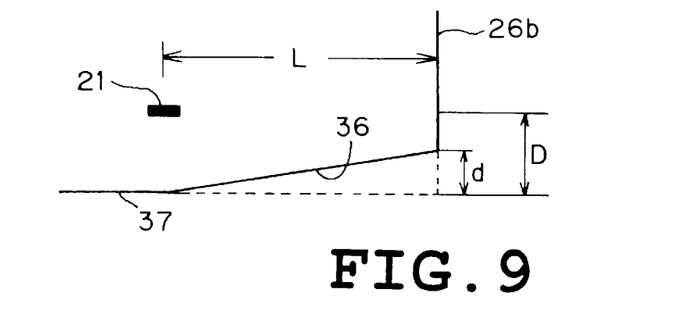
FIG. 9 is an enlarged plan view illustrating an air bearing surface (ABS) on the outer rail.
Figure 10:
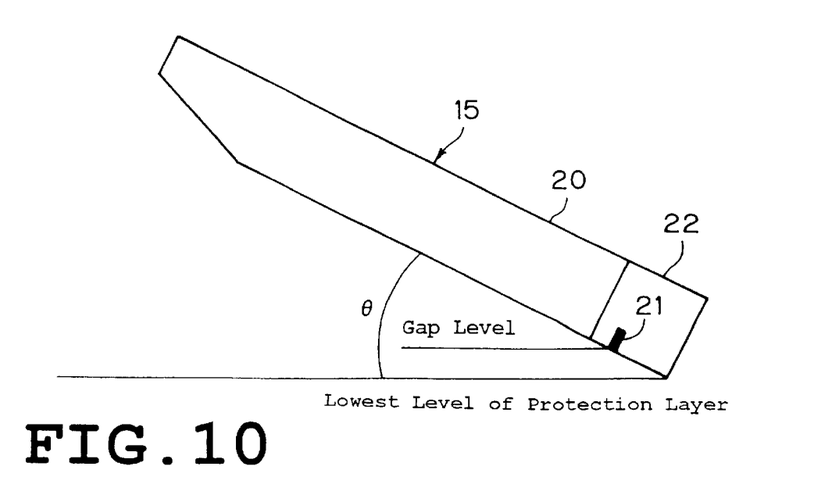
FIG. 10 is a schematic side view of the flying head slider for explaining a pitch angle.
Figure 11:
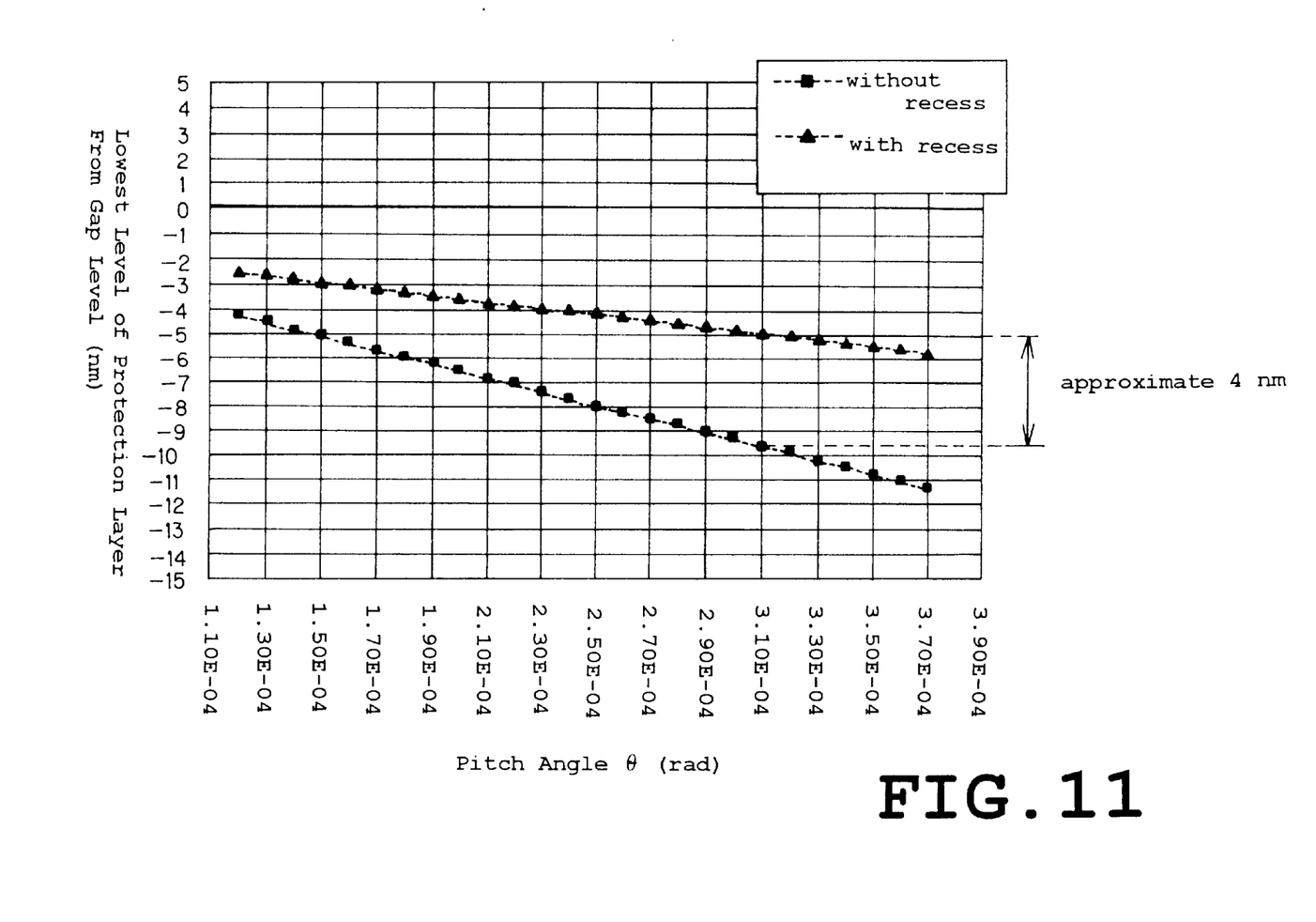
FIG. 11 is a graph showing the variation in the lowest level of the protection layer with the pitch angle varied and with the roll angle constant.

Now, the flying head slider 15 is prepared in which the gap of the magnetic head element 21 is positioned inward from the edge of the outer rail 26b by the amount of L=150 micrometers and from the end surface 37 of the protection layer 22 or outer rail 26b by the amount D=28 micrometers, as shown in FIG. 9. The splay 36 in the outer rail 26b is formed to have the maximum depth d=15 micrometers from the end surface of the outer rail 26b. Assume that the head slider 15 flies over the surface of the magnetic disk 12 taking the slant attitude of the pitch angle θ as shown in FIG. 10. FIG. 11 illustrates the graph showing the flying height of the protection layer 22 with the pitch angle θ varied and the roll angle $B=3.25 \times 10^{-5}$ rad stable.

In FIG. 11, the lowest level of the protection layer 22 is plotted by taking the gap level of the magnetic head element 21 as zero level. A prior art flying head slider without splay is shown by the upper plot line, while the flying head slider of the present embodiment with splay is shown by the lower plot line. As is apparent from FIG. 11, the difference between the gap level of the magnetic head element and the lowest level of the protection layer 22 gets larger as the pitch angle gets larger, in other words, as the slant attitude of the slider body 20 gets severer in the prior art head slider. The protection layer 22 approaches too much to the surface of the magnetic disk 12 as compared with the gap of the magnetic head element 21 in the prior art head slider. On the other hand, the head slider 15 of the present embodiment cannot approach so much to the surface of the magnetic disk 12 as compared with the prior art head slider, as the slant attitude of the slider body 20 gets severer in the head slider of the present embodiment. This tendency becomes remarkable as the slant attitude of the slider body 20 gets severer. For example, the difference in the lowest level of the protection layer between the prior art and the present embodiment becomes approximate 4 nm at the pitch angle of $3.10 \times 10^{-4}$ rad. Accordingly, the magnetic head element 21 can approach more to the surface of the magnetic disk 12 by the amount of approximate 4 nm as compared with prior art if the minimum flying height is determined at the pitch angle of $3.10 \times 10^{-4}$ rad.

Figure 12:
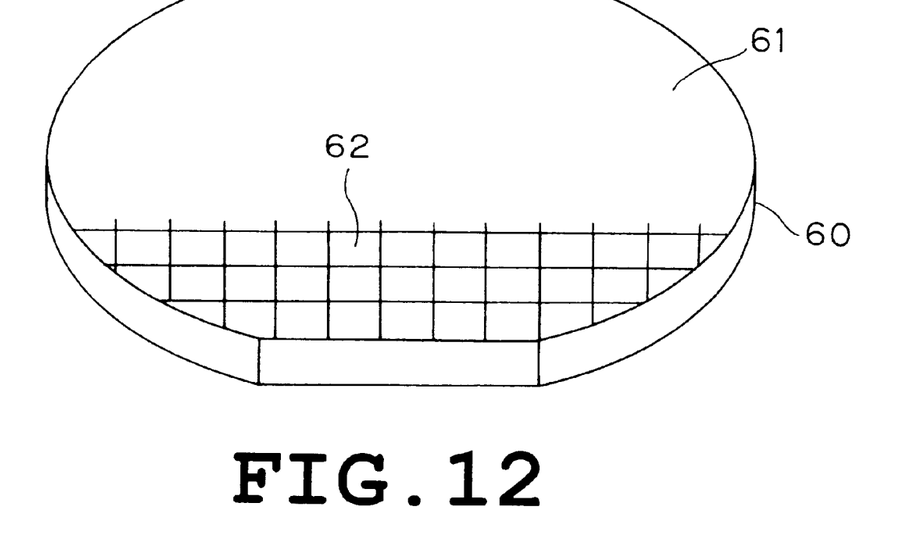
FIG. 12 is an enlarged perspective view illustrating a wafer.
Figure 13:
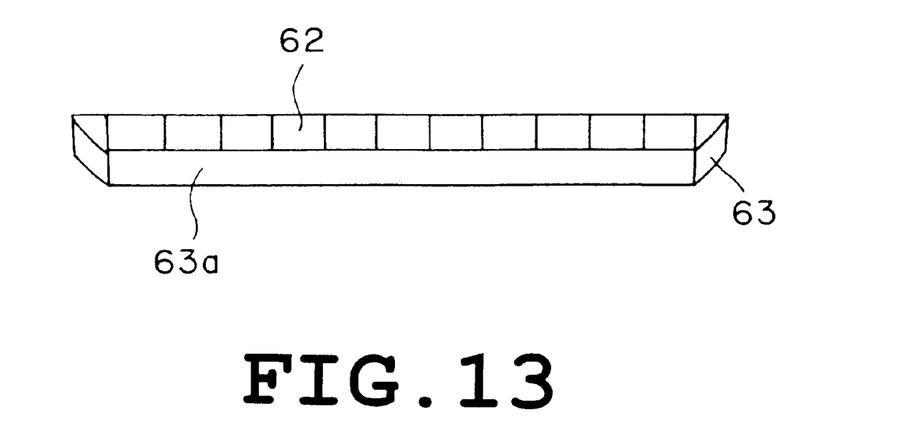
FIG. 13 is a perspective view illustrating a wafer bar cut out of the wafer.

Next, a production process of the flying head slider 15 will be described below. A wafer 60 is first prepared to have an alumina layer formed on the top surface of an alumina titanium carbide plate. As shown in FIG. 12, a plurality of lattice blocks 62 are defined on the surface of the wafer 60. When the magnetic head elements 21 are formed in the respective lattice blocks 62, a wafer bar 63 is cut out of the wafer 60 so that a sequence of the lattice blocks 62 are continuous in the lateral direction of the head sliders 15.

Figure 14:
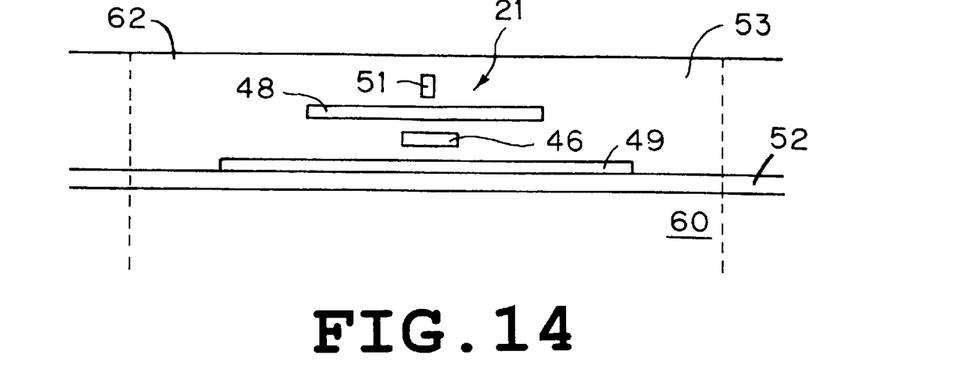
FIG. 14 illustrates the structure of the magnetic head element formed on the wafer.

FIG. 14 illustrates a sectional view for a lattice block 62 taken along a plane parallel to the cutoff surface 63a of the wafer bar 63. In forming the magnetic head element 21, the lower shield layer 49 of FeN, the MR layer 46 of NiFe, the upper shield layer 48 of NiFe are sequentially formed on the alumina layer 52. The coil 50 is printed on the surface of the upper shield layer 48. The upper magnetic pole layer 51 of NiFe is then formed on an insulation layer covering the coil 50. The gap is accordingly formed between the upper shield layer 48 and the upper magnetic pole layer 51. After the formation of the magnetic head element 21 is completed, the alumina layer 53 is formed on the alumina layer 52 for covering over the magnetic head element 21. As a result, the alumina layers 52, 53 define the protection layer 22. The thickness of the protection layer 22 may be set at 35 micrometers, for example. Thinner protection layer 22 may tend to cause the protection layer 22 to peel off.

Figure 15A:
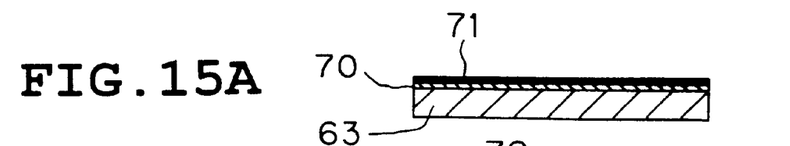
FIGS. 15A–15G illustrate the process for making the flying head slider.

As shown in FIG. 15A, a silicon carbide (SiC) adhesive layer 70 of approximate 2 nm thickness is formed on the cutoff surface 63a of the wafer bar 63 by spattering. A diamond like carbon (DLC) layer 71 of approximate 30 nm thickness is formed on the SiC adhesive layer 70 by plasma CVD (chemical vapor deposition) process.

Figure 15B:
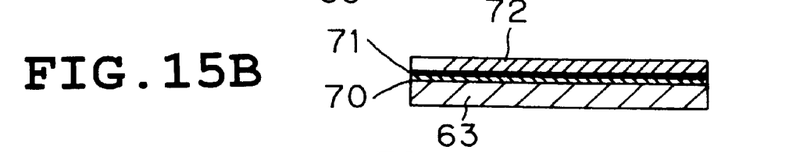
Figures 15C, 15D:
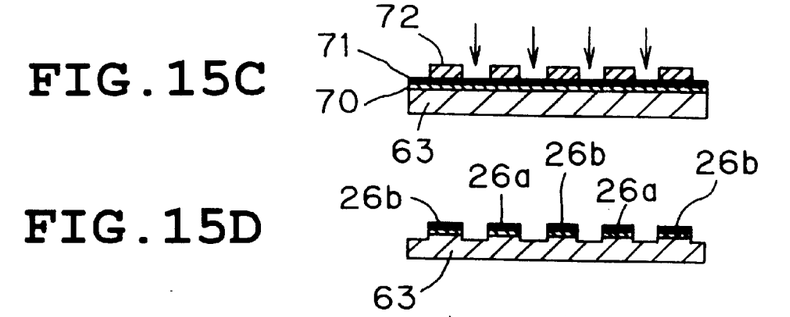

As shown in FIG. 15B, a photoresist 72 is then applied on the DLC layer 71. The photoresist 72 is developed using a mask of a predetermined pattern as shown in FIG. 15C. After the development of the photoresist 72, the inner and outer rails 26a, 26b are formed on the respective lattice blocks 62 by process such as ion milling as shown in FIG. 15D.

Figure 15E:
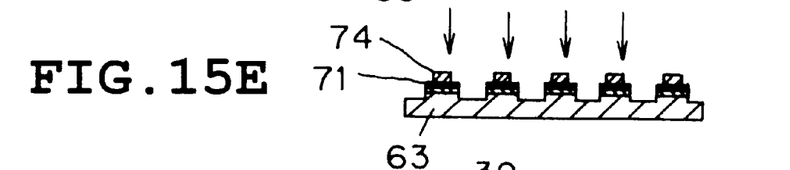
Figure 15F:
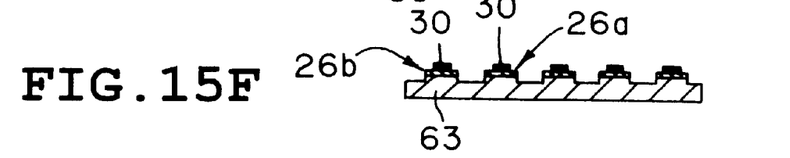
Figure 15G:
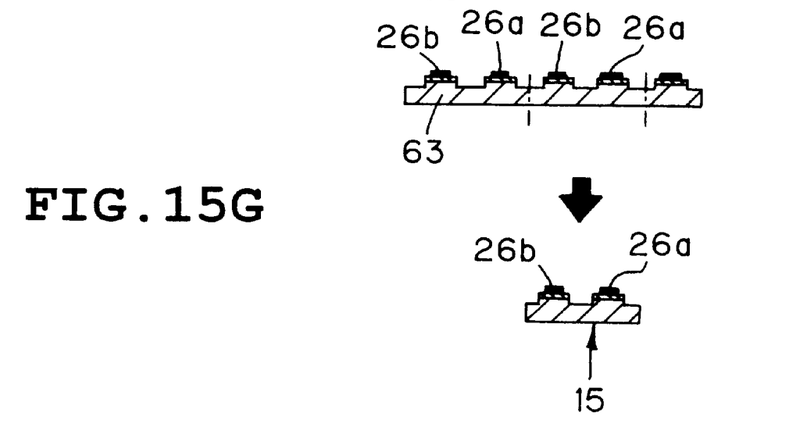

When the inner and outer rails 26a, 26b have been formed, a photoresist is again applied to form a photoresist pattern 74 for the pads 31 through development as shown in FIG. 15E. Subsequently, the DLC layer 71 is eliminated by process such as plasma etching so as to form the pads 31 on the inner and outer rails 26a, 26b as shown in FIG. 15F. Finally, the flying slider 15 of FIG. 2 can be provided by cutting out the respective lattice blocks 62 from the wafer bar 63 as shown in FIG. 15G.

The formation of the pads 31 may employ an amorphous carbon layer such as a carbon layer, a carbon hydride layer, a silicon additive carbon layer, and the like, formed by process such as spattering, in place of the above-described DLC layer. The employment of an amorphous carbon layer serves to provide the pads 31 of sufficient wear resistance against the contact with the surface of the magnetic disk 12, since an amorphous carbon layer has an improved hardness. Alternatively, the pads 31 may be an oxide layer such as $SiO_2$ and $Al_2O_3$ since an oxide layer provides a sufficient wear resistance.

The splay 36a shown in FIG. 7A can be formed at the same time when the inner and outer rails 26a, 26b are formed. For example, if the mask employed in the process of FIG. 15C has a predetermined pattern eliminating a portion corresponding to the splay 36a, the development serves to eliminate the photoresist 72 at a portion corresponding to the splay 36a. Process such as ion milling after the development serves to partly eliminate the outer rail 26b so as to form the splay 36a. Since the splay 36a can be formed in the same process for forming the inner and outer rails 26a, 26b, the splay 36a can be made without any additional processes.

The formation of the splays 36b, 36c shown in FIGS. 7B and 7C requires an additional sequence of processes such as applying photoresist, masking, development, etching, and the like, since the outer rail 26b should be cut off by the level different from the level of the bottom of the flow passage 30. For example, before or after forming the inner and outer rails 26a, 26b, the splays 36b, 36c may be formed to have predetermined depth from the ABS 28 by applying photoresist, masking, developing, and etching using ion milling. The splay 36d in FIG. 7D may be formed by polishing the head slider 15 cut out from the wafer bar 63. An edge of the outer rail 26b is tapered by polishing so as to provide the splay 36d.

Figure 16:
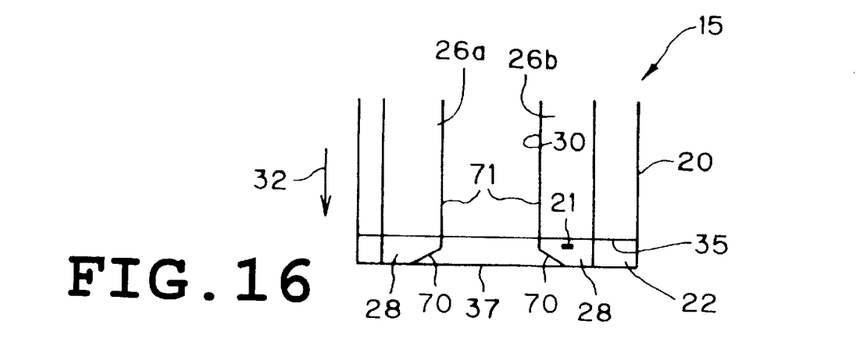
FIG. 16 is a schematic plan view of a flying surface in the flying head slider according to a second embodiment of the present invention.

FIG. 16 illustrates the detailed structure of the flying head slider 15 according to a second embodiment of the present invention. The head slider 15 comprises splays 70 formed on the ABS 28 of the protection layer 22 at the inner and outer rails 26a, 26b downstream of the boundary 35 between the slider body 20 and the protection layer 22 in the direction of the air stream 32. The splays 70 are continuous to the inner surfaces 71 of the inner and outer rails 26a, 26b, respectively. The inner surfaces 71 are a surface intersecting the ABS 28 and define the flow passage 30 in cooperation with each other. The splays 70 increase their depth from the end surface 37, of the protection layer 22, intersecting the ABS 28 as the splays 70 extend inward of the slider body 20. It should be noted that the common reference numerals or characters are attached to the structure achieving the same function and effect as of the above-described first embodiment.

Figure 17A:
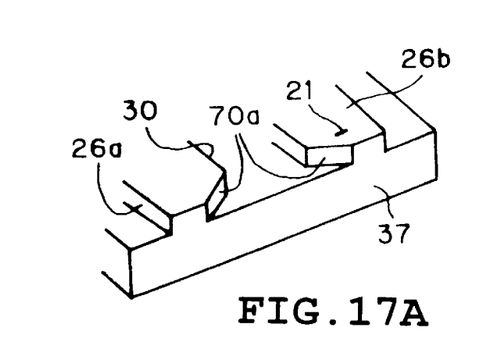
FIGS. 17A–17D illustrate the variation of the splay according to the second embodiment of the present invention.
Figure 17B:
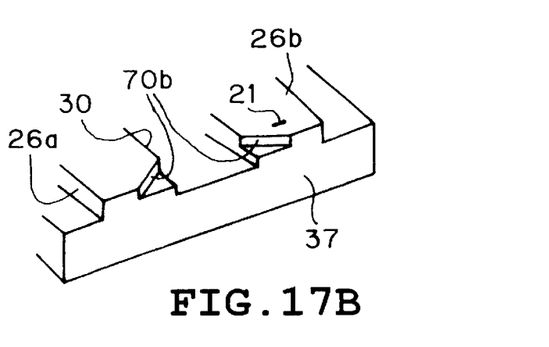
Figure 17C:
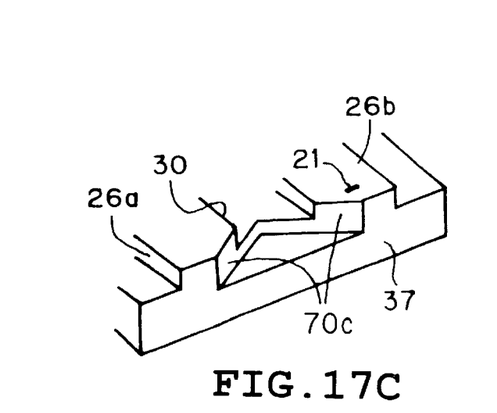
Figure 17D:
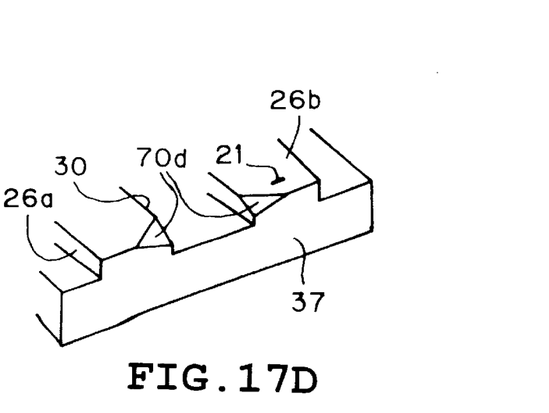

As shown in FIGS. 17A–17D, the above-described splays 70 may take any shapes. For example, the splays 70a may be formed by totally cutting off the inner and outer rails 26a, 26b by the level of the bottom of the flow passage 30 as shown in FIG. 17A. The splays 70b may be formed by partly cutting off the inner and outer rails 26a, 26b by the level above the bottom of the flow passage 30 as shown in FIG. 17B. The splays 70c may be formed by cutting off the inner and outer rails 26a, 26b by the level below the bottom of the flow passage 30 as shown in FIG. 17C. The splays 70d may be formed to have a slant as shown in FIG. 17D. In any event, the splays 70 may be formed using the process applied to the above-described head slider.

Figure 18:
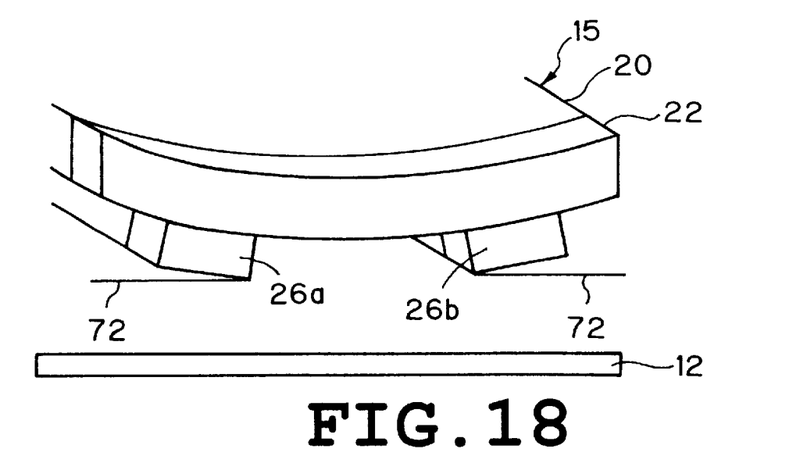
FIG. 18 is a perspective view of the end surface of the flying head slider for describing a warp.

Assume that the slider body 20 suffers from a warp so that the flying height of the outer edges in the lateral direction gets larger as shown in FIG. 18. In this case, the lowest level 72 of the protection layer 22 at the inner and outer rails 26a, 26b excessively approaches to the surface of the magnetic disk 12 as compared with the magnetic head element 21. However, according to the present embodiment, the splays 71 serve to eliminate the protection layer 22 supposed to extend below the level of the magnetic head element 21. As a result, it is possible for the magnetic head element 21 to approach as much as possible to the surface of the magnetic disk 12 by the amount of eliminated protection layer 22. The reading sensitivity of the magnetic head element 21 can be enhanced.

Figure 19:
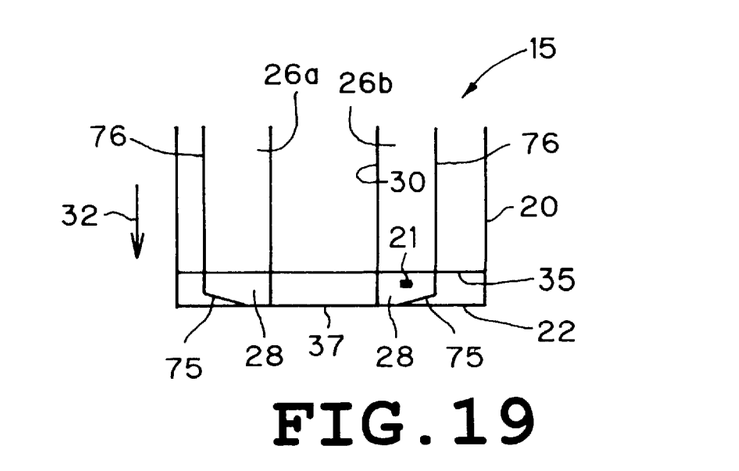
FIG. 19 is a schematic plan view of a flying surface in the flying head slider according to a third embodiment of the present invention.

FIG. 19 illustrates the detailed structure of the flying head slider 15 according to a third embodiment of the present invention. The head slider 15 comprises splays 75 formed on the ABS 28 of the protection layer 22 at the inner and outer rails 26a, 26b downstream of the boundary 35 between the slider body 20 and the protection layer 22 in the direction of the air stream 32. The splays 75 are continuous to the outer surfaces 76 of the inner and outer rails 26a, 26b, respectively, as contrary to the above-described second embodiment. The outer surfaces 76 are a surface intersecting the ABS 28. The splays 75 increase their depth from the end surface 37, of the protection layer 22, intersecting the ABS 28 as the splays 75 extend outward of the slider body 20. It should be noted that the common reference numerals or characters are attached to the structure achieving the same function and effect as of the above-described first embodiment.

Figure 20A:
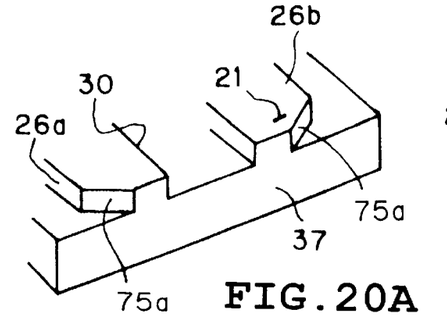
FIGS. 20A–20D illustrate the variation of the splay according to the third embodiment of the present invention.
Figure 20B:
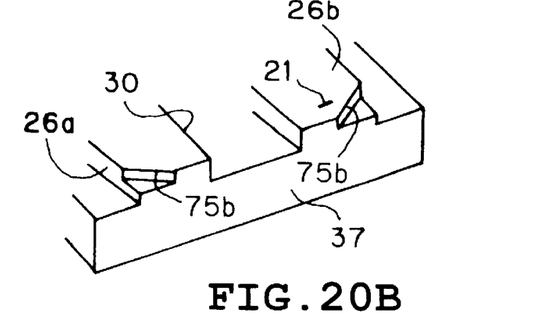
Figure 20C:
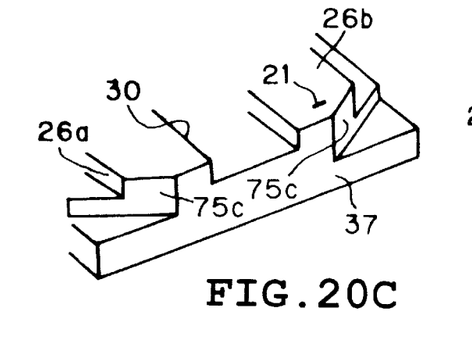
Figure 20D:
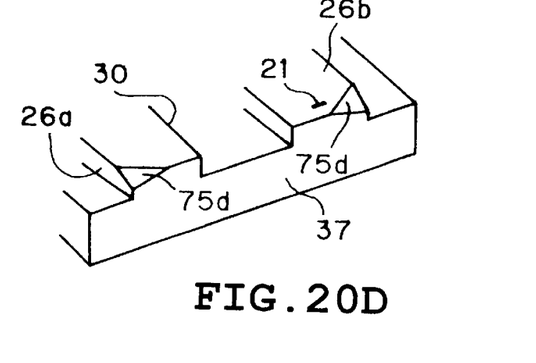

As shown in FIGS. 20A–20D, the above-described splays 75 may take any shapes. For example, the splays 75a may be formed by totally cutting off the inner and outer rails 26a, 26b by the level of the bottom of the flow passage 30 as shown in FIG. 20A. The splays 75b may be formed by partly cutting off the inner and outer rails 26a, 26b by the level above the bottom of the flow passage 30 as shown in FIG. 20B. The splays 75c may be formed by cutting off the inner and outer rails 26a, 26b by the level below the bottom of the flow passage 30 as shown in FIG. 20C. The splays 75d may be formed to have a slant as shown in FIG. 20D. In any event, the splays 75 maybe formed using the process applied to the above-described head slider.

Figure 21:
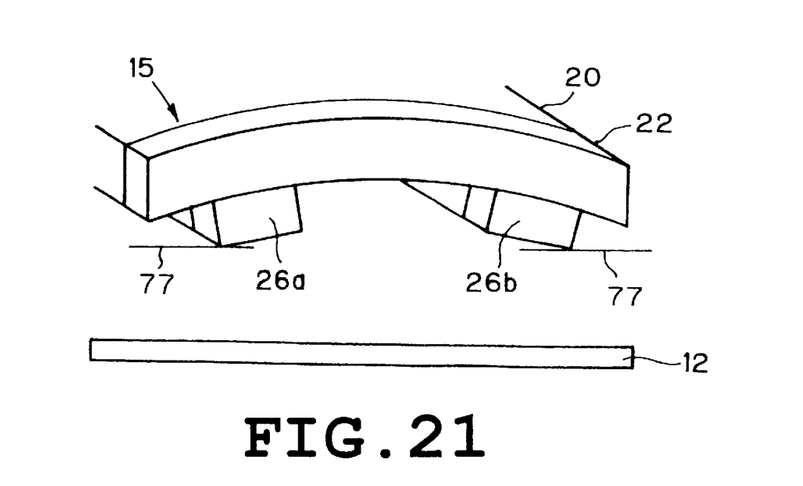
FIG. 21 is a perspective view of the end surface of the flying head slider for describing an inverse warp.
Figure 22A:
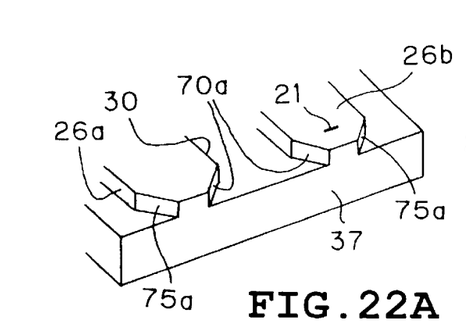
FIGS. 22A–22D illustrate the combination of the splays according to second and third embodiments of the present invention.
Figure 22B:
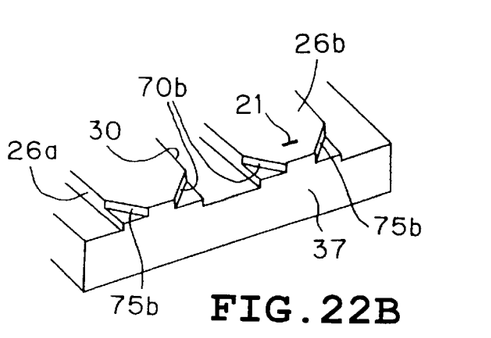
Figure 22C:
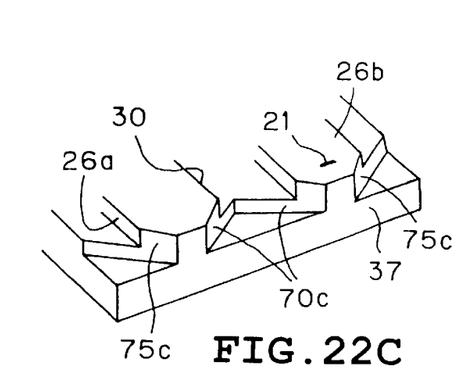
Figure 22D:
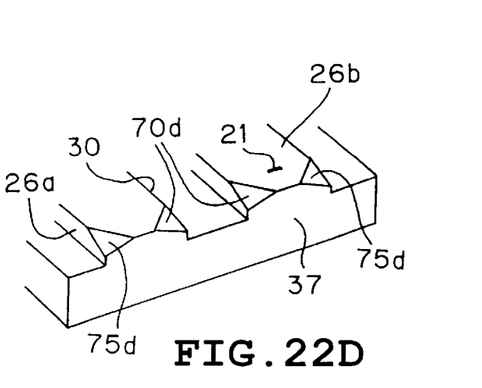

Assume that the slider body 20 suffers from an inverse warp so that the flying height of the outer edges in the lateral direction gets smaller as shown in FIG. 21. In this case, the lowest level 77 of the protection layer 22 at the inner and outer rails 26a, 26b excessively approaches to the surface of the magnetic disk 12 as compared with the magnetic head element 21. However, according to the present embodiment, the splays 75 serve to eliminate the protection layer 22 supposed to extend below the level of the magnetic head element 21. As a result, it is possible for the magnetic head element 21 to approach as much as possible to the surface of the magnetic disk 12 by the amount of eliminated protection layer 22. The reading sensitivity of the magnetic head element 21 can be enhanced.

In general, it is difficult to predict either of a warp or an inverse warp of the slider body 20. Accordingly, it is preferable to properly combine the splays 70a–70d, as shown in FIGS. 17A–17D, on the inner surfaces 71 of the inner and outer rails 26a, 26b and the splays 75a–75d, as shown in FIGS. 20A–20D, on the outer surfaces 76 of the inner and outer rails 26a, 26b, as shown in FIGS. 22A–22D.

Any of the above-described flying head slider can be employed in a magnetic disk apparatus other than the HDD, or in a recording disk apparatus such as a magneto optical disk apparatus of a contact start stop type.

What is claimed is:

1. A flying head slider comprising:
    a slider body changeable in attitude and supported with respect to a surface of a recording disk;
    a head element supported on an end surface of the slider body downstream of an air stream running along the slider body during rotation of the recording disk;
    a protection layer formed on the end surface of the slider body for covering over the head element; and
    a splay formed on an air bearing surface of the protection layer only in a portion of the protection layer downstream of a boundary between the slider body and the protection layer.

2. The flying head slider according to claim 1, wherein said head element comprises a flexible coil pattern bent toward a center of a coil at a portion corresponding to said splay.

3. The flying head slider according to claim 1, wherein a pair of rails are formed on the slider body at a flying surface opposed to the surface of the recording disk, and said splay is formed at one of the rails which supports the head element at an end surface of the rail within said end surface of the slider body.

4. The flying head slider according to claim 3, wherein said head element comprises a flexible coil pattern bent toward a center of a coil at a portion corresponding to said splay.

5. The flying head slider according to claim 1, wherein said splay increases in depth from an end surface of the protection layer intersecting the air bearing surface as said splay extends to recede from the head element.

6. The flying head slider according to claim 5, wherein said head element comprises a flexible coil pattern bent toward a center of a coil at a portion corresponding to said splay.

7. The flying head slider according to claim 1, wherein said slider body comprises a pad formed on the air bearing surface for preventing the slider body from clinging to the surface of the recording disk.

8. The flying head slider according to claim 7, wherein said head element comprises a flexible coil pattern bent toward a center of a coil at a portion corresponding to said splay.

9. The flying head slider according to claim 1, wherein said splay enables the flying head slider to fly closely to the surface of the recording disk while reducing the likelihood of collision between the protection layer and the surface of the recording disk.

10. The flying head slider according to claim 1, wherein said splay is terminated at a position downstream of said boundary.

11. The flying head slider according to claim 1, wherein said splay is defined by a line intersecting a downstream edge and a longitudinal edge for defining said air bearing surface on a rail extending on said slider body, said downstream edge of said air bearing surface being generally linear and extending in a direction of said air stream, said longitudinal edge of said air bearing surface being generally perpendicular to said downstream edge.

12. A flying head slider comprising:
   a slider body changeable in attitude and supported with respect to a surface of a recording disk;
   at least a pair of rails arranged on a flying surface opposed to the surface of the recording disk;
   a head element supported on an end surface of at least one of said pair of rails downstream of an air stream running along the slider body during rotation of the recording disk;
   a protection layer formed on an end surface of the slider body for covering over the head element, said end surface including the end surfaces of the rails; and
   a pair of splays formed on an air bearing surface of the protection layer at the respective said pair of rails only in a portion of the protection layer downstream of a boundary between the slider body and the protection layer.

13. The recording disk apparatus according to claim 12, wherein said splays enable the flying head slider to fly closely to the surface of the recording disk while reducing the likelihood of collision between the protection layer and the surface of the recording disk.

14. The flying head slider according to claim 12, wherein said head element comprises a flexible coil pattern bent toward a center of a coil at a portion corresponding to one of said splays.

15. The flying head slider according to claim 12, wherein said splays extend over inner surfaces of said pair of rails, said inner surfaces intersecting the air bearing surface.

16. The flying head slider according to claim 15, wherein said splays increase in depth from an end surface of the protection layer intersecting the air bearing surface as said splays extend inward to said slider body.

17. The flying head slider according to claim 16, wherein said head element comprises a flexible coil pattern bent toward a center of a coil at a portion corresponding to one of said splays.

18. The flying head slider according to claim 12, wherein said splays extend over outer surfaces of said pair of rails, said outer surfaces intersecting the air bearing surface.

19. The flying head slider according to claim 18, wherein said splays increase in depth from an end surface of the protection layer intersecting the air bearing surface as said splays extend outward from said slider body.

20. The flying head slider according to claim 19, wherein said head element comprises a flexible coil pattern bent toward a center of a coil at a portion corresponding to one of said splays.

21. A recording disk apparatus comprising:
   a recording disk;
   a slider body changeable in attitude;
   a carriage supporting the slider body with respect to a surface of the recording disk;
   a head element supported on an end surface of the slider body downstream of an air stream running along the slider body during rotation of the recording disk;
   a protection layer formed on the end surface of the slider body for covering over the head element; and
   a splay formed on an air bearing surface of the protection layer only in a portion of the protection layer downstream of a boundary between the slider body and the protection layer.

22. The recording disk apparatus according to claim 21, wherein said splay enables the slider body to fly closely to the surface of the recording disk while reducing the likelihood of collision between the protection layer and the surface of the recording disk.

23. The recording disk apparatus according to claim 21, wherein said head element comprises a flexible coil pattern bent toward a center of a coil at a portion corresponding to said splay.

24. The recording disk apparatus according to claim 21, wherein a pair of rails are formed on the slider body at a flying surface opposed to the surface of the recording disk, and said splay is formed at one of the rails which supports the head element at an end surface of the rail within said end surface of the slider body.

25. The recording disk apparatus according to claim 24, wherein said head element comprises a flexible coil pattern bent toward a center of a coil at a portion corresponding to said splay.

* * * * *